Figure 4:
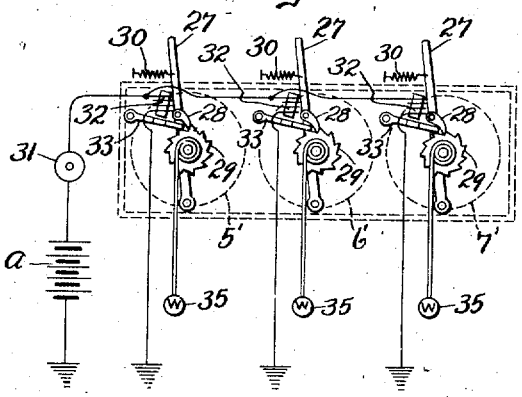

R. C. LEAKE.
ELECTRICAL DISTRIBUTING SYSTEM.
APPLICATION FILED MAY 12, 1909.
Reissued Feb. 25, 1913.
13,534.
2 SHEETS—SHEET 1.
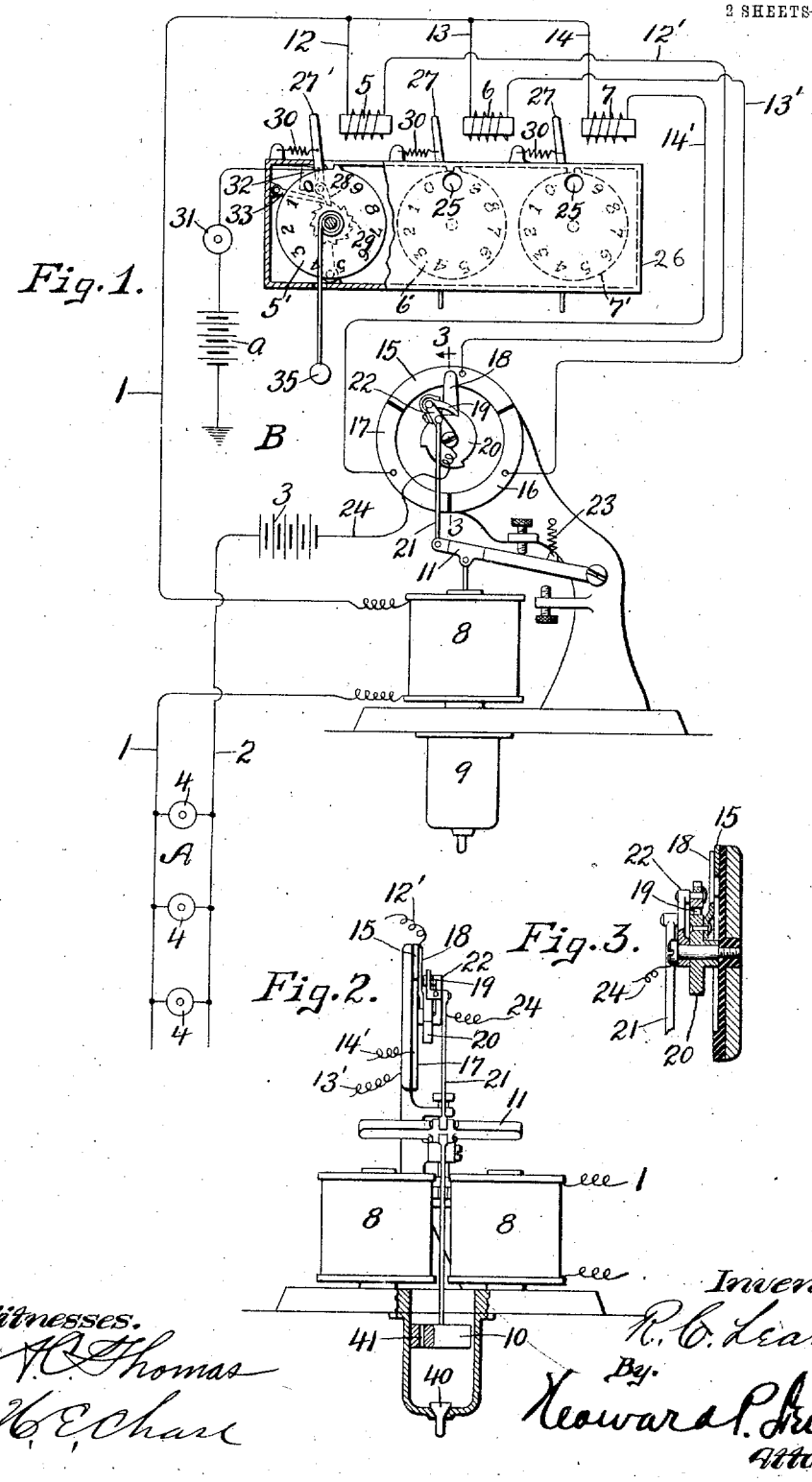
Witnesses.
H. C. Thomas
H. E. Chase
Inventor.
R. C. Leake
By.
Howard P. Denison
Attorney.

R. C. LEAKE.

ELECTRICAL DISTRIBUTING SYSTEM.

APPLICATION FILED MAY 12, 1909.

Reissued Feb. 25, 1913.

13,534.

2 SHEETS—SHEET 2.

Witnesses.

A. C. Thomas

H. E. Chase

Inventor.

R. C. Leake

By.

Howard P. Denison

Attorney.

BEST AVAILABLE COPY BEST AVAILABLE COPY

UNITED STATES PATENT OFFICE.

RICHARD C. LEAKE, OF AUBURN, NEW YORK.

ELECTRICAL DISTRIBUTING SYSTEM.

13,534. Specification of Reissued Letters Patent. Reissued Feb. 25, 1913.

Original No. 853,888, dated May 14, 1907, Serial No. 281,711. Application for reissue filed May 12, 1909. Serial No. 495,567.

*To all whom it may concern:*

Be it known that I, RICHARD C. LEAKE, a citizen of the United States, residing at Auburn, in the county of Cayuga and State of New York, have invented a new and useful Improvement in Electrical Distributing Systems, of which the following is a specification.

This invention relates to improvements in electrical distributing systems and involves one or more electrical transmission devices at one or more local sending stations and a plurality of electrically operated devices at one or more remote or distant receiving stations, each electrically connected in a separate circuit receiving current from the same or different source of electric energy, and all of which are controlled individually or successively by one of the transmission devices at the sending station. These several devices at the receiving station may be substantial duplicates of each other or may differ in their function in performing the same or different work, but each separate working circuit at the receiving station includes a coil or winding or some equivalent electrical appliance capable of operating some mechanical or electro mechanical apparatus, such as a signal, annunciator, counter or similar mechanism, or may be used in telegraphy, telephony and allied systems, as for instance, for opening and closing the several circuits of an automatic telephone exchange, and for many other purposes which cannot now be enumerated.

It may be stated here that the invention resides more particularly in the means for making and breaking any number of distant circuits, individually or successively, so that each circuit may be made to perform some individual work which may be or may not be associated with the work performed by the energizing of the other circuits, and it is, therefore, quite immaterial what kind of a mechanism is brought into action by the energizing of either of the circuits.

One of the primary objects of the invention is to minimize the number of line conductors employed in the system from the sending to the receiving stations so that the energizing of the entire series of distant circuits at the receiving station or stations may be controlled from the sending station over a two-conductor system, one of which is the main feed wire, and the other the return wire or the ground, as may be desired.

In some instances, it may be necessary to make and break one or more of the distant working circuits a number of times to effect the repeating of a certain mechanical operation, and then to shift or change from this circuit to another circuit, and in order to accomplish this I have introduced into the system, preferably at the receiving station, an automatic circuit changing device which is controlled by the sender at the transmitting station, and by which I am enabled to successively close the several working circuits at the receiving station, and to simultaneously break the previously energized working circuit.

The energizing of each individual working circuit at the receiving station is effected by one or more comparatively quick current impulses corresponding to the dots of the "Morse" telegraph system, while the circuit changing device is brought into action by a prolonged closing of the circuit at the sending station, corresponding to the dash of said Morse telegraph system, and in order that the circuit changing device may not be brought into complete action to change from one working circuit to another at the receiving station during such quick current impulses, I associate with the electro mechanical circuit-changer a retarding influence which may be of any suitable construction capable of retarding the action of the circuit changer under quick current impulses but still having the ability to yield under a prolonged closing of the circuit at the sending station to move the circuit changer one point or step.

The general object, therefore, is to render it practicable to open and close a plurality of distant electric circuits individually or successively over a minimum number of line conductors leading from the sending to the receiving instruments by means of varying periods of duration as "pauses" or "holds" between current pulsations.

Other more specific objects and uses will be brought out in the following description.

Figure 5:
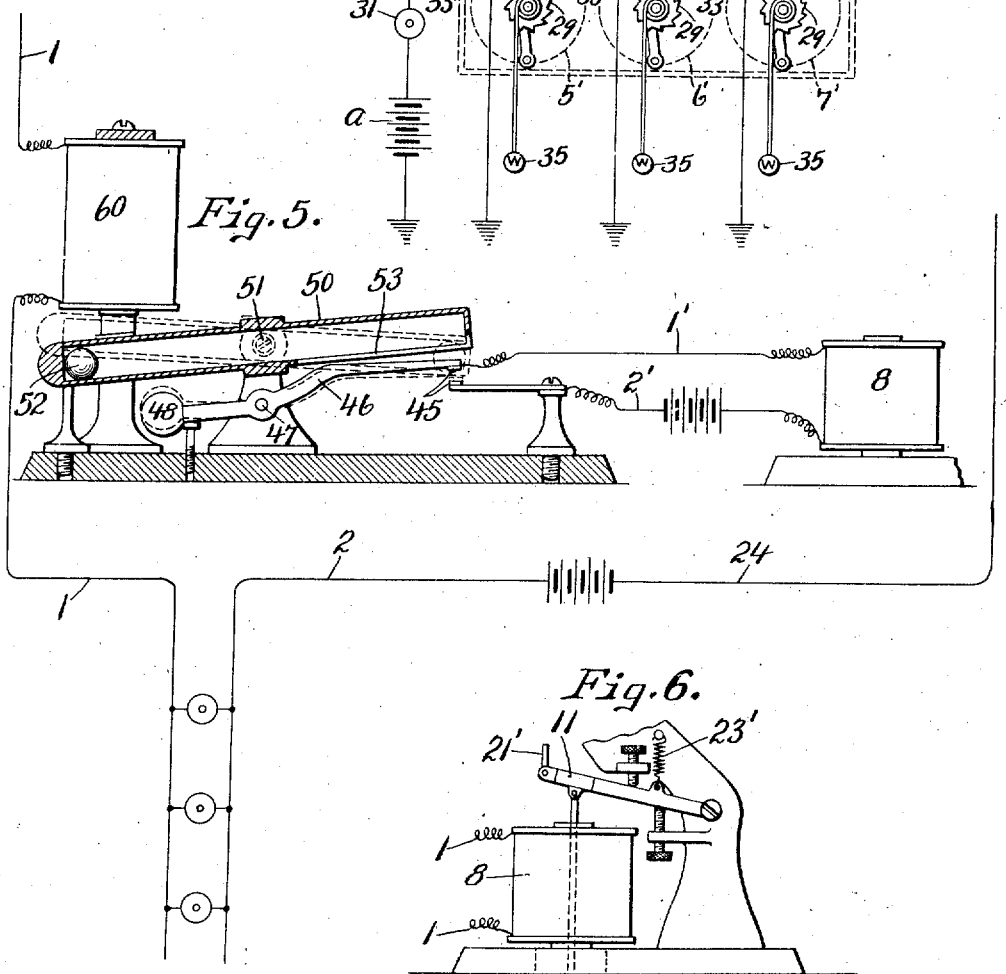
Figure 6:
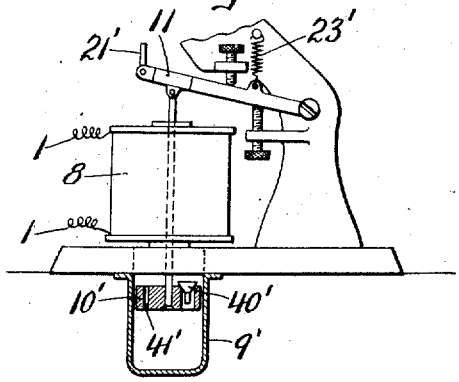

In the drawings—Figure 1 is a diagrammatic view of an electrical distributing system embodying the various features of my invention. Fig. 2 is a face view of the detached electro-mechanical circuit changing device including the means for retarding its action under quick current impulses. Fig. 3 is a sectional view taken on line 3—3, Fig. 1. Fig. 4 is an enlarged elevation of one of the electrically operated counters at the receiving station seen in Fig. 1; showing also the means for restoring said counter to its normal starting position. Fig. 5 is a diagrammatic view of a portion of the electrical distributing system seen in Fig. 1, showing a modified form of retarding mechanism for preventing the action of the circuit changing device under quick current impulses, and effecting such action by a prolonged closing of the circuit through the sending instrument at the transmission station. Fig. 6 is a still further modified form of retarding device adapted to be substituted for that shown in Fig. 1, and by which the circuit changer is caused to act by a long pause intervening between the intermittent current impulses.

In order to clearly demonstrate the practicability of my invention I have shown in Fig. 1, somewhat diagrammatically an electrical distributing system, including a transmission station —A—, and a distant receiving station —B—, which stations are connected by a minimum number of line conductors, consisting in this instance, of a main feed wire —1—; a return conductor —2— which may be either a wire or ground, such conductors constituting the main line circuit receiving current from a source of electric energy, as a battery —3—, in which is connected at the transmission station, a suitable electric switch —4—, whereby current impulses may be transmitted over the line conductors to the receiving station.

At the receiving station I have shown a plurality of, in this instance three, electro magnets, 5, 6 and 7—, each having its winding connected in a separate circuit, but for the purpose of simplifying the drawing, I have shown all of these circuits capable of deriving current from the same source of electric energy, as the battery —3—, of the main line circuit. Each of these electro-magnets —5, 6 and 7—, are adapted to perform certain work which may be similar or entirely different, one from the other, and while I have shown a series of similar mechanical counting devices 5′, 6′ and 7′ each adapted to be brought into action by its particular electro magnet, 5, 6 or 7. I do not wish to limit my invention to its association with any particular form of device which may be brought into action by the energizing of each individual working circuit in which the electro magnets 5, 6 and 7— are connected for it will be clearly obvious from the following description that the electro magnets —5, 6 and 7— may be substituted by solenoids or other electrically operated instruments and I have only shown these electro magnets —5, 6 and 7—, and the counters —5′, 6′ and 7′— as a means for clearly demonstrating the practicability and operation of my invention.

The important part of my invention, as associated with the several distinct circuits at the receiving station, consists in providing the receiving station with a suitable circuit changer, such as a multi-pole switch, which is only brought into action by the prolonged closing of the circuit at the sending station through the medium of the switch —4— and an electro magnet —8— having its winding connected in the main line circuit, the action of the circuit changer being prevented by some retarding influence, as a dash-pot —9— having a piston —10— which is connected to the armature as —11—, of the electro magnet —8—.

One end of each of the windings —5, 6 and 7— is electrically connected by wires —12, 13 and 14— respectively to the main feed wire —1— of the line circuit —1— and —2—, and the other ends of each of said windings of the magnets —5, 6 and 7— are connected respectively by wires —12′, 13′ and 14′— to metal contact terminals —15, 16 and 17— respectively. These latter terminals or pole-pieces —15—, 16 and 17— preferably consist of circular metal segments arranged about a common axis and insulated at their ends, one from the other, either by insulating material, or by an air gap. An additional contact terminal —18— is mounted to rotate about said axis to contact successively with the segmental terminals 15, 16 and 17—, and is actuated step by step from one segmental terminal to another by the armature —11— through the medium of a pawl —19—, ratchet —20— and a connecting link —21— connecting the free end of the armature —11— to a swinging lever —22— upon which the pawl —19— is mounted, said armature being held away from the adjacent pole of the electro magnet —8— by means of a spring —23—.

The contact arm —18— is electrically connected by a wire —24— to the same source of electric energy as the battery —3—, in which the windings of the electro magnets —5, 6 and 7— are connected, and it, therefore, follows that when the contact arm —18— is moved into contact with the segment —16— the circuit through the electro magnet —6— is closed by breaking the circuit through the electro magnet —5—, and in like manner as the arm —18— is shifted from the segment —16— to the segment —17— the circuit through the electro magnet —7— will be closed, and that through the electro mganet —6— will be simultaneously broken. As previously stated, this movement of the contact arm —18— successively into contact with the segments —15, 16 and 17— is effected through the prolonged energizing of the electro magnet —8—, but is prevented from operation during quick current impulses, as will be presently described more in detail.

The counters 5′, 6′ and 7′ each consist of a rotary disk, each having a normal starting point or space and a series of successively arranged numerals, numbering from 0 to 9 inclusive so that the starting point or space and consecutive numerals are successfully brought into registration with a suitable slight opening —25— of a supporting case or frame —26—. Any suitable means may be employed for rotating each disk step by step so as to bring the numerals successively into registration with their respective openings —25—, and I have shown the operating means for each disk as consisting essentially of a swinging armature —27— carrying a pawl —28—, which latter engages and rotates a ratchet-wheel —29— to which one of the counter-disks is secured, each of the electro magnets —5, 6 and 7— having associated therewith one of the armatures —27— whereby each successive energizing of one of the electro magnets attracts its armature —27— and rotates its counter-disk one step or space from its normal or starting position, each armature being returned to its normal position by a suitable spring —30—. In the counting device shown, it is necessary to restore each counting disk to its normal or starting position, and for this purpose I associate with each disk or counter a second electro magnet —32— and an armature —33—, which, when attracted by its armature engages and lifts the pawl —28— out of engagement with its ratchet-wheel —29—, the electro magnet —32— being connected in a local circuit which derives current from a battery as —a— and is provided with a switch —31—, under the control of a local attendant at the receiving station so that by closing the circuit through the magnet —32— and thereby lifting the pawl —28— to release the counter disk, the latter is returned to its normal position by any suitable means, as a counter-weight —35—, as best seen in Fig. 4. By means of these counters, any number or combination of numbers from 0 to 999 may be registered, but it is clearly apparent that the counters may be used in other relations, and that the number of counters and combinations of numbers which may be registered are practically unlimited—so far as theory or principle of the device is concerned.

The dash-pot —9— is shown as provided at its bottom with a valve —40— opening inwardly to admit air beneath the piston —10—, and this piston is provided with a comparatively small bleed hole —41—, the dash-pot being open to atmosphere above the piston so that the upward movement of said piston is practically unobstructed or unretarded by reason of the opening —40— to equalize the pressure at both ends of the piston, while on the other hand any tendency to attract or draw the armature —11— downwardly, as by the current impulses passed through the electro magnet —8—, would be opposed by the air pressure beneath the piston —10— caused by the automatic closing of the valve —40—. It, therefore, follows that by providing a comparatively small bleed hole —41— in the piston, a prolonged closing of the circuit at the transmission station —A— by the switch —4—, which exerts a magnetic pull upon the armature —11—, would allow the air to gradually escape through the bleed hole —41—, thus permitting the armature to be drawn to the limit of its inward movement, thereby moving the pawl —19— into position to engage the next tooth of the ratchet-wheel —20— so that when the switch —4— is open, thereby deënergizing the electro magnet —8—, the spring —23— returns the armature to its normal position, and thus rotates the ratchet-wheel —20— one tooth space and advances the contact arm —18— one segmental space, or from the segment —15— into contact with the segment —16—. In like manner the arm —18— is advanced from contact with one segment to electrical contact with the next adjacent segment until returned to its starting position.

In Fig. 6 I have shown a modification of the retarding device seen in Figs. 1 and 2 in which a piston —10′— is movable is a dash-pot —9′—, but is retarded in its upward movement, or on the return of the armature —11—, instead of during its movement toward the adjacent pole of the magnet —8—. In this latter retarding device, the piston is provided with a comparatively small bleed-hole —41′— and a larger vertical passage which is normally closed by a valve —40′—, the bottom of the dash-pot —9′— being closed and the valve —40′— is adapted to open upwardly to allow the armature —11—, which is connected to the piston —10′— by a rod —21′— to descend readily under the magnetic influence of the electro magnet —8—, but is retarded in its return movement, which is effected by the spring —23′—. This arrangement of the dash-pot —9′— and piston —10′— causes the armature to be drawn downwardly where it remains during the short impulses transmitted over the line wires —1— and —2— and slowly returns to its normal position under the action of the spring —23′— under a comparatively long pause or interval between the current pulsations through the electro magnet —8—, thereby effecting the shift or change of contact of the arm —18— from one segment, as from —15 to 16.

The essential difference in principle between the device shown in Fig. 6 and that shown in Figs. 1 and 2—is that in the former, the change of circuit at the receiving station is effected during a pause, or comparatively long interruption between the current pulsations rather than by the prolonged closing of the circuit, as in the device shown in Figs. 1 and 2.

In Fig. 5 I have shown a still further modified retarding device in which the electro magnet —8— is connected in a separate circuit —1′— and —2′— with an electric switch —45—, one of the members of the switch being mounted upon a weighted lever —46—, which is fulcrumed at —47— and is provided with a weight —48—, whereby the switch —45— is normally held open. Directly above the switch-lever —46— is a vertically rocking tube —50— which is centrally pivoted at —51— and contains a rolling member, as a ball —52—. One end of this tube, at one side of its pivot —51—, lies directly over the switch end of the lever —46— and its lower side is slotted lengthwise, but of less width than the diameter of the ball —52— to permit said ball to ride along the slot within the tube and to project slightly therethrough when this end of the tube is tilted to contact with the switch end of the lever —46—, the slot, as —53— serving to receive the adjacent end of the lever —46—, and the weight of the ball riding upon this lever operating to close the switch —45— against the action of the counter weight —48—. The opposite end of the tube —50— is weighted sufficiently to counter balance the weight of the ball when in the slotted end of the tube, and when no other influence is brought to bear upon the action of the tube —50—, its slotted end is tilted upwardly to allow the switch —45— to open and break the circuit —1′— and —2′— through the electro magnet —8—, thereby causing the ball —52— to roll down the inclined tube from the slotted end into the extreme weighted end, or to the opposite side of the pivot —51—. In this modification shown in Fig. 5, I provide an auxiliary electro magnet —60— having its winding connected in the main line circuit —1 and 2— so that any current impulses caused by the closing of the switch —4— at the sending station energizes the electro magnet —60— and tends to attract the weighted end of the tube —50—, which constitutes an armature for said electro magnet. Under such quick current impulses, however, the weighted end of the tubular armature —50— is rocked from the point below to a point above the horizontal plane of the swinging axis of the tube, and the inertia of the ball —52—, together with the centrifugal force acting upon it during such impulsive action of the tube tends to keep the ball in the weighted end of said tube, but upon a slightly prolonged closing of the circuit through the magnet —60— by means of the switch —4— the weighted end of the armature —50— is held up by the electro magnet —60—, thereby allowing the ball —52— to roll along the inclined bottom of the tube and into the slot —53—, thereby depressing the underlying end of the lever —46— and closing the switch —45— and circuit —1′— and —2′— through the electro magnet —8—, which, in turn, operates the armature —11— and contact arm —18— to change the circuit by shifting said arm from one segment, as —15— to the next segment, as —16—. As soon as the switch —4— is again opened, the magnet —60— is deënergized and allows the tubular armature —50— to rock in the opposite direction by its own gravity, thus allowing the switch —45— to be opened by the weighted lever —46—.

In the operation of the device shown in Figs. 1 to 4 suppose it is desired to cause the disks 5′, 6′ and 7′ to indicate the number —789— then by closing the switch —4— eight times in quick succession, will produce eight current impulses through the electro magnet —5—, thereby moving the counter-disk —5′— step by step from its starting point until the numeral —7— is brought into registration with the opening —25— corresponding to the disk 5′. When the circuit is closed for the eighth time, it is held closed for a sufficient period to allow the armature —11— to be drawn downwardly the limit of its downward movement against the action of the spring —23—, thereby retracting the pawl —19— one tooth space around the ratchet-wheel —20— so as to engage the next adjacent tooth, and when the circuit is broken at the sending station by the opening of the switch —4— the spring —23— will return the armature —11— to its normal position, thereby actuating the pawl —19— and its ratchet-wheel —20— forwardly one tooth space to shift the contact arm —18— from the terminal segment —15— to the next terminal segment —16—. By this operation, the circuit is broken through the electro-magnet —5— and is established through the electro-magnet —6—. Now, by repeating the closing of the circuit in quick succession nine times, through the medium of the switch —4—, and prolonging the last contact of the switch, the counter —6′— will be advanced step by step from its starting position until the numeral 8 is brought into registration with its opening —25— and the contact arm —18— will then be advanced from contact with the segment 16 into contact with the segment —17—, thereby breaking the circuit through the electro-magnet 6 and closing another circuit through the electro-magnet —7—. Now, by again repeating the operation of the switch —4— ten times in quick succession, and prolonging the last closing of the circuit by said switch, the counter 7′ is advanced step by step until the numeral —9— is brought into registration with its opening —25—, at which time, the contact arm —18— is moved from the segment —17— to the first or starting position in contact with the segment —15—, which breaks the circuit through the electro-magnet —7— and again closes it through the first named electro magnet —5—, ready for a repetition of the operation just described, it being understood, of course, that each counter —6′— and —7′— is provided with the same operating means and restoring mechanism as that described for the counter —5—, and that each of said counters is restored to its starting position by a counter-weight as —35—, after each pawl —28— has been released from engagement with its ratchet-wheel —29— in the manner previously described.

What I claim is:—

1. In a system of electrical distribution, a plurality of working circuits, an electrically operated circuit changing switch controlling said circuits, means operated at will for impressing current impulses on said circuits and for operating said switch, additional means to retard the action of the switch under comparatively short current impulses and to permit its action under prolonged closing of any one of said circuits.

2. In a system of electrical distribution, a plurality of electric working circuits, each deriving current from a single line conductor, a circuit changing switch common to said circuits in circuit with said line conductor, electrically controlled means for actuating the circuit changing switch, and additional means for retarding the movement of the switch actuating means in one direction under comparatively short current pulsations through said electrically controlled means, but adapted to permit such action under prolonged closing of the circuit.

3. In a system of electrical distribution, a line conductor, and a plurality of electric working circuits, each connected to said conductor, a circuit changing switch common to all circuits, a circuit closer and an electro-magnet both in the main line circuit, means controlled by said magnet for controlling the operation of the circuit changer, and a retarding device for the circuit changer actuating means, whereby said actuating means is brought into action only by the prolonged closing of the circuit through the electro-magnet.

4. In a system of electrical distribution, a main line circuit comprising a main feed wire and return conductors, including therein a sending station and a receiving station, a plurality of circuit closers connected in the main circuit at the sending station, a plurality of branch circuits at the receiving station, a circuit changing switch for opening one of the branch circuits and closing another branch circuit, the closed branch circuit being energized by the current impulses produced by the circuit closers at the sending station of the main circuit, and means brought into action by the prolonged closing of the circuit at the sending station for actuating the circuit-changing switch.

5. In a system of electrical distribution, a main line circuit including a sending and a receiving station, comprising a single main feed wire and return conductor, a circuit closer in the main line circuit at the sending station, a series of branch circuits deriving current from the main line circuit, a series of electrically operated devices at the receiving station, one for each of said branch circuits, electric means in each of the circuit changing switch common to all of said branch circuits, an electro magnet in the main line circuit energized by the closing of the circuit closer, an armature for said electro magnet, means controlled by the armature for controlling the operation of the circuit changer, additional means for preventing the operation of the circuit changer under quick impulses produced by the circuit closer in the main line circuit, whereby the device corresponding to the closed branch circuit at the receiving station is operated, said means for preventing the action of the circuit closer under quick current impulses through the electro magnet being actuated by the prolonged energizing of the electro magnet to cause the operation of the circuit changing switch to change from one branch circuit to another.

6. In a system of electrical distribution, a plurality of electric working circuits, a multi-pole electric switch having separate contact terminals, one for each circuit, electrically operated means in circuit with each of said working circuits for shifting the switch to close the working circuits successively, and means for retarding the action of said switch under short current impulses but allowing its operation under prolonged closing of the circuit.

7. In a system of electrical distribution, a plurality of electric circuits, each including therein an electro-magnet, a multi-pole switch and its operating electro-magnet, both electrically connected in circuit with one or another of the first named electro-magnets, means for closing said last named circuit, additional means for retarding the action of the switch under short current impulses, said switch operating magnet operating under prolonged closing of the circuit to overcome the retarding means and to break the circuit through one of the first named electro-magnets and close the circuit through a different one of said first named magnets, and a plurality of indicating devices, each actuated by one of the first named electro-magnets when energized.

8. In an electrical distributing system, a plurality of electric working circuits, each including therein an electro-magnet, a plurality of mechanical devices, each actuated by one of said magnets, a multi-pole switch for successively connecting said magnets with the source of energy, an additional electro-magnet for operating said switch, means for simultaneously energizing the last named magnet and one of the first named magnets which may be in electrical connection with the switch and additional means for preventing the operation of the switch under short current impulses but allowing the operation of said switch under prolonged closing of the circuit through the switch operating magnet.

9. In combination with a series of rotary mechanical elements and separate electrical operating devices therefor, whereby each of the former is rotated step by step by successive closing of the circuit through its operating device, means for releasing the rotary elements, separate devices for restoring the rotary elements to their starting positions, a multi-pole switch in circuit with said electrical devices, an electro-magnet for operating the switch, means for closing the circuit through said magnet and the electrical device which may be in electrical connection with the switch and means for retarding the action of the switch under short current impulses through said magnet but permitting the operation of said switch under prolonged closing of the circuit through said magnet.

10. In an electrical distributing system, a plurality of mechanical movements, and a corresponding number of electrical working circuits, each including therein an electro-magnet for operating one of said mechanical movements step by step at each energizing of its magnet, an electric switch having contact terminals in circuit with said magnets, a magnet to operate said switch, a circuit closer for simultaneously closing the circuit through the last named magnet and that one of the first named magnets which may be in electrical connection with the switch and means controlled by the last named magnet for operating said switch under prolonged closing of the circuit but preventing the operation of said switch under comparatively short current impulses therethrough.

11. An electric selective system comprising a two-wire main line circuit having a multi-contact circuit-changing switch and an electro-magnet connected in series in said circuit, a series of electric translating devices connected to the main line circuit and to their respective contacts of the switch, means for impressing current impulses of the same strength and polarity upon the main line circuit for energizing the electro-magnet, additional means controlled by the electro-magnet for operating the switch, and further means for detaining the switch-operating means under such current impulses.

12. In an electric selective system, a two-wire main circuit having means therein operable voluntarily for impressing current impulses thereon, an electro-magnet connected in said circuit, a circuit-changing switch in series with the magnet, translating devices electrically connected to the contacts of the switch and to the main line circuit, switch-operating means controlled by the electro-magnet and separate means for deferring the action of the switch-operating means until a pause in the impulses of the main line.

13. In an electric selective system, a two-wire main line circuit having an electro-magnet, a circuit-changing switch and a series of translating devices connected to the main line circuit and to said switch, voluntarily operative means for impressing current impulses of the same strength and polarity upon said circuit, switch-operating means, controlled by the electro-magnet, and means for deferring the action of said switch-operating means under such impulses and for causing such action under a prolonged pause in the impulses.

14. In an electric selective system, a two-wire main circuit having an electro-magnet, a circuit-changing switch and an electric translating device connected in series therein, means for impressing current impulses of the same strength and polarity upon said circuit, a self-retracting armature for the electro-magnet, connections between the armature and switch for operating the latter, means for deferring the action of the armature to operate the switch until a pause occurs in the impulses, a movable self-retracting member, actuated step by step at each operation of the translating device, a detent for holding said member in its advanced position and electrically operated means for tripping the detent to allow said member to restore itself to its starting position.

In witness whereof I have hereunto set my hand this 8th day of May, 1909.

RICHARD C. LEAKE.

Witnesses:

H. E. CHASE,

ELMER E. RUST.